(12) United States Patent
Tanaka et al.

(10) Patent No.: US 9,079,994 B2
(45) Date of Patent: Jul. 14, 2015

(54) POLYMERIZABLE COMPOSITIONS

(71) Applicant: GC Corporation, Bunkyo-ku (JP)

(72) Inventors: Koji Tanaka, Itabashi-ku (JP); Miki Nishiya, Kawaguchi (JP); Futoshi Fusejima, Kitamoto (JP)

(73) Assignee: GC CORPORATION, Bunkyo-ku (JP)

( * ) Notice: Subject to any disclaimer, the term of this patent is extended or adjusted under 35 U.S.C. 154(b) by 0 days.

(21) Appl. No.: 14/039,126

(22) Filed: Sep. 27, 2013

(65) Prior Publication Data
US 2014/0094578 A1 Apr. 3, 2014

(30) Foreign Application Priority Data
Sep. 28, 2012 (JP) ................. 2012-217639

(51) Int. Cl.
| C08F 2/00 | (2006.01) |
|---|---|
| C08F 4/52 | (2006.01) |
| C08F 4/28 | (2006.01) |
| C08F 20/06 | (2006.01) |
| C08F 118/02 | (2006.01) |
| C08F 220/28 | (2006.01) |
| C08F 4/40 | (2006.01) |
| C08K 5/37 | (2006.01) |
| C08F 220/20 | (2006.01) |
| C08F 230/02 | (2006.01) |
| C08F 222/10 | (2006.01) |
| C08F 222/22 | (2006.01) |

(52) U.S. Cl.
CPC ............. C08F 220/28 (2013.01); C08F 4/40 (2013.01); C08K 5/37 (2013.01); *C08F 220/20* (2013.01); *C08F 230/02* (2013.01); *C08F 2220/282* (2013.01); *C08F 2222/102* (2013.01); *C08F 2222/1013* (2013.01); *C08F 2222/1033* (2013.01); *C08F 2222/225* (2013.01)

(58) Field of Classification Search
CPC ......... D06M 14/06; D06M 14/00; C08F 4/40; C08F 2222/225; C08F 2220/282; C08F 230/02; C08F 2222/102; C08F 2222/1033; C08F 2222/1013; C08F 220/20; A61K 6/083; C08K 5/37
USPC .............. 526/214, 227, 317.1, 319, 199, 89
See application file for complete search history.

(56) References Cited

U.S. PATENT DOCUMENTS

| 3,552,911 A * | 1/1971 | Habib et al. .................. 8/128.1 |
| 2011/0165098 A1 | 7/2011 | Jewett et al. |

FOREIGN PATENT DOCUMENTS

| JP | 8-500080 A | 1/1996 |
| JP | 10-338610 A | 12/1998 |
| JP | 2012-51856 A | 3/2012 |
| WO | WO 95/22955 A1 | 8/1995 |
| WO | WO 2007/112134 A2 | 10/2007 |
| WO | WO 2007/112134 A3 | 10/2007 |

OTHER PUBLICATIONS

Extended European Search Report issued Dec. 6, 2013, in European Patent Application No. 13004698.0.

* cited by examiner

*Primary Examiner* — William Cheung
(74) *Attorney, Agent, or Firm* — Oblon, McClelland, Maier & Neustadt, L.L.P.

(57) ABSTRACT

A polymerizable composition that comprises a first component comprising a (meth)acrylate and an organic peroxide as an oxidizing agent and a second component comprising a (meth)acrylate and a cysteine as a reducing agent which has a partial structure represented by the following structural formula, the first component and/or the second component further comprising a polymerization promoter:

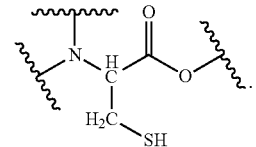

6 Claims, No Drawings

POLYMERIZABLE COMPOSITIONS

FIELD OF THE INVENTION

The present invention relates to polymerizable compositions for use in the field of dental treatment. In particular, the present invention relates to polymerizable compositions that show satisfactory curability under wet conditions as in the oral cavity on dental treatment as well as long-term storage stability and which, when cured, are free from discoloration and toxicity.

BACKGROUND OF THE INVENTION

In the field of dental treatment, there are used prostheses such as crowns, bridges and inlays to repair or substitute for missing or defective teeth or oral tissues. As materials for adhering these prostheses to teeth, compositions are mainly used that comprise polymerizable resins and filler particles; these compositions cure through such mechanisms as cold (chemical) polymerization and photopolymerization.

To effect cold polymerization of polymerizable compositions that contain radical polymerizable methacrylates, acrylates or other monomers, oligomers, and prepolymers, a commonly used means is a redox-radical polymerization initiator system consisting of an oxidizing agent in combination with a reducing agent. For example, a polymerization initiator in which an organic peroxide as an oxidizing agent is combined with an aromatic tertiary amine as a reducing agent has been used for quite a few years (see, for example, JP H10-338610 A). Under water-free conditions, this initiator presents no problem with the polymerizability of monomers but under wet conditions as in the oral cavity, it has sometimes occurred that the polymerization of monomers is inhibited.

As mentioned above, polymerizable compositions for use in the field of dental treatment need be polymerized under wet conditions as in the oral cavity. To this end, a polymerization catalyst is required that can be exposed to water without suffering a drop in polymerizing activity but there are not many polymerization catalysts that are known to satisfy this requirement. Among the very few exceptions is a polymerization initiator system that consists of a water-soluble reducing agent such as ascorbic acid and a water-soluble oxidizing agent such as persulfate (see, for example, JP H8-500080 A). This initiator system shows satisfactory curing property even in the presence of water. In practice, however, the storage stability of this initiator system is so low that it has been necessary to take the trouble of microencapsulating either the oxidizing agent or the reducing agent or both.

Another problem with the above-described approach is that the polymer containing ascorbic acid undergoes discoloration; to solve this problem, preliminary metal complexing of ascorbic acid has been proposed but this method presents another problem of requiring a very complicated procedure (see, for example, WO 95/22955).

The assignee of the present invention previously developed a polymerization initiator system consisting of cumene hydroperoxide, a thiourea derivative, and a vanadium compound (see JP 2012-51856 A). This system is held to be useful since it ensures not only outstanding curing property but also satisfactory storage stability. However, most thiourea derivatives are extremely toxic and acetylthiourea and N-benzoylthiourea, in particular, which are superior polymerization initiators are highly toxic to humans and, hence, have been unsuitable for use in the oral cavity as an ingredient of dental materials even if their amount is small.

OBJECT OF THE INVENTION

An object, therefore, of the present invention is to provide polymerizable compositions that show satisfactory curability under wet conditions as in the oral cavity on dental treatment as well as long-term storage stability and which, when cured, are free from discoloration and toxicity.

SUMMARY OF THE INVENTION

The present inventors made intensive studies with a view to solving the aforementioned problems and found that polymerizable compositions that would show outstanding curability under wet conditions as well as outstanding long-term storage stability and which, when cured, would be free from discoloration and toxicity were obtained by using a polymerization initiator system consisting of an organic peroxide, a cysteine, and a polymerization promoter, wherein the organic peroxide is incorporated as an oxidizing agent and the cysteine as a reducing agent. The present invention has been accomplished on the basis of this finding.

Briefly, the present invention provides a polymerizable composition that comprises a first component comprising a (meth)acrylate and an organic peroxide as an oxidizing agent and a second component comprising a (meth)acrylate and a cysteine as a reducing agent which has a partial structure represented by the following structural formula, the first component and/or the second component further comprising a polymerization promoter:

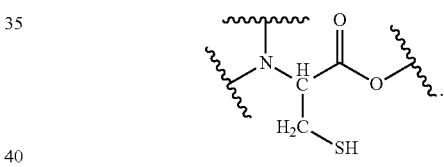

The polymerizable composition according to the present invention is a superior product that shows satisfactory curability under wet conditions as in the oral cavity on dental treatment as well as long-term storage stability and which, when cured, is free from discoloration and toxicity.

DETAILED DESCRIPTION OF THE INVENTION

The polymerizable composition according to the present invention utilizes the radical polymerization of (meth)acrylates due to the redox reaction with the oxidizing agent and the reducing agent; a (meth)acrylate and an organic peroxide as the oxidizing agent are incorporated in the first component whereas a (meth)acrylate and a cysteine as the reducing agent are incorporated in the second component; in addition, a polymerization promoter is incorporated in the first component and/or the second component. Since the first component and the second component both contain a (meth)acrylate, they are basically in a paste form.

In the present invention, the (meth)acrylate means acrylate compounds or methacrylate compounds in various forms of monomers, oligomers and prepolymers. The (meth)acrylate polymerizes and cures to form a cured matrix. The amount of the (meth)acrylate to be incorporated is preferably at least 15 wt % for each of the first and second components, and if it is less than 15 wt %, the paste becomes so hard that it is difficult to handle. Examples of the (meth)acrylate to be used in the present invention include methyl(meth)acrylate, ethyl(meth)acrylate, isopropyl(meth)acrylate, n-butyl(meth)acrylate, isobutyl(meth)acrylate, hydroxypropyl(meth)acrylate, tetrahydrofurfuryl(meth)acrylate, glycidyl(meth)acrylate, 2-hydroxyethyl(meth)acrylate, 2-hydroxypropyl(meth)acrylate, 3-hydroxypropyl(meth)acrylate, 2-methoxyethyl(meth)acrylate, 2-ethoxyethyl(meth)acrylate, 2-ethylhexyl(meth)acrylate, benzyl(meth)acrylate, 2-hydroxy-1,3-di(meth)acryloxypropane, ethylene glycol di(meth)acrylate, diethylene glycol di(meth)acrylate, triethylene glycol di(meth)acrylate, butylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate, trimethylolpropane tri(meth)acrylate, trimethylolethane tri(meth)acrylate, pentaerythritol tri(meth)acrylate, trimethylolmethane tri(meth)acrylate, pentaerythritol tetra(meth)acrylate, polybutylene glycol di(meth)acrylate, and bisphenol A diglycidyl (meth)acrylate, and these monomers or oligomers or prepolymers can be used with advantage. As examples of (meth)acrylate having a urethane bond, mention may be made of di-2-(meth)acryloxyethyl-2,2,4-trimethylhexamethylene dicarbamate, 1,3,5-tris[1,3-bis{(meth)acryloyloxy}-2-propoxycarbonylaminohexane]-1,3,5-(1H,3H, 5H)triazine-2,4,6-trione, 2,2-bis-4-(3-(meth)acryloxy-2-hydroxypropyl)-phenylpropane, etc. and other examples include methoxypolyethylene glycol (meth)acrylate, a (meth)acrylate of a urethane oligomer consisting of 2,2'-di(4-hydroxycyclohexyl)propane, 2-oxepanone, hexamethylene diisocyanate, and 2-hydroxyethyl(meth)acrylate, a (meth)acrylate of a urethane oligomer consisting of 1,3-butanediol, hexamethylene diisocyanate, and 2-hydroxyethyl(meth)acrylate, etc. These can be used either independently or in admixture of two or more species.

In the present invention, (meth)acrylates having an acid group can also be used. The (meth)acrylates having an acid group polymerize and cure to form a cured matrix and, in addition, they are effective in helping the polymerizable composition to adhere to the tooth structure, as well as to ceramics (e.g. zirconia and alumina) and noble metal containing alloys that serve as the material for dental restorations. The (meth)acrylate having an acid group is preferably incorporated in an amount of 1 to 50 wt % in the first component and/or the second component. If its amount is less than 1 wt %, the intended adhesion is difficult to result; on the other hand, if its amount is greater than 50 wt %, too high an acidity is likely to inhibit the polymerization of the (meth)acrylates and the curing speed tends to become considerably slow. The (meth)acrylates having an acid group are preferably (meth)acrylates having a phosphate group or a carboxyl group, and use can be made of (meth)acrylates having one or several phosphate groups or carboxyl groups in the molecule. Being more acidic than the carboxyl group, the phosphate group is highly effective in dissolving the smear layer on tooth surface or causing demineralization of the tooth structure and, in particular, it makes great contribution to improving the adhesion to enamel.

Exemplary (meth)acrylates having a phosphate group include 2-(meth)acryloyloxyethyl dihydrogen phosphate, bis[2-(meth)acryloyloxyethyl dihydrogen]phosphate, 2-(meth)acryloyloxyethylphenyl dihydrogen phosphate, 6-(meth)acryloyloxyhexyl dihydrogen phosphate, 6-(meth)acryloyloxyhexylphenyl dihydrogen phosphate, 10-(meth)acryloyloxydecyl dihydrogen phosphate, 1,3-di(meth)acryloylpropane-2-dihydrogen phosphate, 1,3-di(meth)acryloylpropane-2-phenyl hydrogen phosphate, bis[5-{2-(meth)acryloyloxyethoxycarbonyl}heptyl]hydrogen phosphate, etc. Among these, 10-(meth)acryloyloxydecyl dihydrogen phosphate is particularly preferred from the viewpoints of adhesion and the stability of the (meth)acrylate itself. The above-listed (meth)acrylates having a phosphate group may be used either independently or in admixture of two or more species.

Exemplary (meth)acrylates having a carboxyl group include 4-(meth)acryloxyethyl trimellitic acid, 4-(meth)acryloxyethyl trimellitic anhydride, 4-(meth)acryloxydecyl trimellitic acid, 4-(meth)acryloxydecyl trimellitic anhydride, 11-(meth)acryloyloxy-1,1-undecanedicarboxylic acid, 1,4-di(meth)acryloyloxypyromellitic acid, 2-(meth)acryloyloxyethyl maleic acid, 2-(meth)acryloyloxyethyl phthalic acid, 2-(meth)acryloyloxyethyl hexahydrophthalic acid, etc. Among these, 4-(meth)acryloxyethyl trimellitic acid and 4-(meth)acryloxyethyl trimellitic anhydride are particularly preferred from the viewpoint of adhesion. The above-listed (meth)acrylates having a carboxyl group may be used either independently or in admixture of two or more species.

The organic peroxide to be incorporated in the polymerizable composition according to the present invention works as the oxidizing agent in the polymerization initiator system and is stable in the (meth)acrylate. It is preferably incorporated in the first component in an amount of 0.1 to 5 wt %; if its amount is less than 0.1 wt %, it tends to function only insufficiently as the oxidizing agent; on the other hand, if it is incorporated in an amount greater than 5 wt %, the (meth)acrylate in the first component is prone to polymerization and the storage stability of the composition tends to deteriorate. The organic peroxide may be exemplified by tert-butyl hydroperoxide, cumene hydroperoxide, etc. Among these, tert-butyl hydroperoxide is particularly preferred since it is outstandingly stable in the (meth)acrylate.

In the present invention, a cysteine is incorporated as the reducing agent in the polymerization initiator system. Cysteines are amino acids or amino acid derivatives and many of them are incorporated in foods, pharmaceuticals, supplements, and so on. Hence, compared to thiourea derivatives, cysteines have high in vivo safety and are suitable as substances from which dental materials for use in the oral cavity can be made. The cysteine to be incorporated in the polymerizable composition according to the present invention is stable in the (meth)acrylate. It is preferably incorporated in the second component in an amount of 0.1 to 5 wt %; if its amount is less than 0.1 wt %, it tends to function only insufficiently as the reducing agent; on the other hand, if it is incorporated in an amount greater than 5 wt %, a stable cure time is difficult to achieve. The cysteines to be used in the present invention have a partial structure represented by the following structural formula:

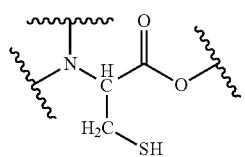 [SMILES: *OC(=O)C(CS)N(*)*]

In this structural formula, the bonds beyond wavy lines on the nitrogen atom and the right-side oxygen atom are not particularly limited and may occur in various modes; in the case of the nitrogen atom, the two bonds may combine with a hydrogen atom (to form —$NH_2$; amino group), or one or both bonds may combine with an alkyl group (to form —NHR or —$NR_2$ (R=alkyl group); N-alkyl-substituted) or combine with a carbonyl group (to form —NHCO—; amido group); in the case of the oxygen atom, the bond may combine with a hydrogen atom (to form —COOH; carboxylic acid) or combine with an alkyl group (to form —COOR; ester). Among these exemplary cases, cysteine, acetylcysteine, cysteine methyl ester, cysteine ethyl ester, and glutathione are particularly advantageous because not only can they react with the organic peroxide in high efficiency but they also have superior storage stability.

The sulfur atom, on the other hand, must combine with a hydrogen atom to form a thiol group (—SH). This is because the hydrogen atom on the thiol group displays a reducing action. Therefore, a compound that has no such hydrogen atom, say, cysteic acid, cannot be used in the present invention.

Various optical isomers of the cysteines can be used without any discrimination and they may be in a D-form, an L-form, or a mixture of the two forms. Two or more cysteines may be used in admixture. Furthermore, those cysteines may be reacted with various acids to form salts (e.g. hydrochloride, sulfate, and phosphate.) In this case, a neutralizing agent such as calcium hydroxide or magnesium oxide is preferably incorporated in order to neutralize the acid in the acid salt.

The polymerization promoter to be incorporated in the polymerizable composition according to the present invention is not particularly limited as long as it is stable in the (meth)acrylate. It is preferably incorporated in an amount of 0.001 to 1 wt % in the first component and/or the second component; if its amount is less than 0.001 wt %, its effect as the polymerization promoter tends to be insufficient whereas if its amount is greater than 1 wt %, it might potentially cause coloration (browning) or allow the (meth)acrylate to be polymerized during storage.

The polymerization promoter may be exemplified by copper compounds such as copper sulfate, acetylacetone copper, copper chloride, copper gluconate, copper oleate, and ethylenediaminetetraacetic acid disodium copper(II), and vanadium compounds such as vanacium acetylacetonate, vanadyl acetylacetonate, vanadyl stearate, vanadium naphthenate, and vanadium benzoylacetonate.

For enhanced strength, the polymerizable composition according to the present invention may have a filler incorporated in either the first component or the second component or both. If it is to be used as a dental adhesive composition, a filler may be incorporated in both components to render them in a paste form, which is much easier to handle. The filler is preferably incorporated in an amount of 5 to 85 wt % in the first component and/or the second component; if less than 5 wt % of the filler is incorporated, the desired effect will not fully develop whereas if its amount is greater than 85 wt %, the paste becomes so hard that it is difficult to handle. The filler may be exemplified by glasses such as silicic anhydride, barium glass, alumina glass, potassium glass, and fluoroaluminosilicate glass, and powders such as synthetic zeolite, calcium phosphate, feldspar, fumed silica, aluminum silicate, calcium silicate, magnesium carbonate, hydrous silicic acid, hydrous calcium silicate, hydrous aluminum silicate, and quartz.

To help them bind to the (meth)acrylate, these fillers may be surface treated with silane coupling agents such as γ-methacryloxypropyltrimethoxysilane, vinyltrichlorosilane, vinyltriethoxysilane, vinyltrimethoxysilane, and vinyltriacetoxysilane. If desired, the aforementioned fillers may be preliminarily mixed with the already described (meth)acrylate monomers or oligomers and polymerized to cure and thereafter ground to prepare organic/inorganic composite fillers, which can also be used in the present invention. The above-mentioned fillers may be used either independently or in admixture of two or more species. Among these fillers, silicic anhydride, fumed silica and quartz are the most stable when they are present together with the acid component. Needless to say, different fillers may be used for the first and the second component which are to be used in the present invention.

The polymerizable composition according to the present invention preferably comprises the first and the second component in a weight ratio ranging from 10:1 to 1:10. Outside this range, the polymerization catalyst is difficult to balance between the first and the second component and a problem might potentially take place during polymerization. A mixing procedure to prepare the polymerizable composition according to the present invention may be performed manually by the operator using a spatula and a mixing pad or by using an automatic mixing system with the aid of a mixing tip.

It also goes without saying that depending on the need, the polymerizable composition according to the present invention may get commonly used additives (e.g. photopolymerization catalyst, polymerization inhibitor, anti-microbial agent, and pigment) to be incorporated in suitable amounts in either the first component or the second component or both. Water may similarly be incorporated in the polymerizable composition in order to enhance the reactivity with tooth structure of the (meth)acrylate having an acid group. Likewise, a thickener such as carboxymethyl cellulose can also be incorporated.

On the following pages, the present invention will be described specifically by means of Examples but it should be understood that the following Examples are in no way intended to limit the scope of the present invention.

EXAMPLES

Samples of Examples 1 to 4 and Comparative Examples 1 to 3 were prepared in accordance with the recipes shown in Table 2 below and evaluated for both curability under wet conditions and storage stability.

The abbreviations in Table 2 have the following meanings.

HEMA: 2-hydroxyethyl methacrylate

M-90G: methoxypolyethylene glycol #400 methacrylate

Bis-GMA: 2,2-bis-4-(3-methacryloxy-2-hydroxypropyl)-phenylpropane

TEGDMA: triethylene glycol dimethacrylate

UDMA: di-2-methacryloxyethyl-2,2,4-trimethylhexamethylene dicarbamate

MDP: 10-methacryloyloxydecyl dihydrogen phosphate

4MET: 4-methacryloxyethyl trimellitic acid

CHPO: cumene hydroperoxide tBHPO: tert-butyl hydroperoxide $SiO_2$ powder: silicon dioxide powder Glass powder: For the glass powder that was incorporated as a filler, see Table 1 below.

Aerosil: Fumed silica (trade name, R812; manufactured by Nippon Aerosil Co., Ltd.)

DW: distilled water

IA: 6-tert-butyl-2,4-xylenol

TPO: 2,4,6-trimethylbenzoyldiphenylphosphine oxide

The composition of the glass powder incorporated as the filler is shown below in Table 1.

TABLE 1

|  | (g) |
|---|---|
| Aluminum oxide | 21 |
| Silicic anhydride | 44 |
| Calcium fluoride | 12 |
| Calcium phosphate | 14 |
| Strontium carbonate | 9 |

The ingredients listed in Table 1 were mixed and held in an electric oven at 1200° C. for 5 hours to melt the glass. The molten glass was quenched, ground in a ball mill for 10 hours, and passed through a 200 mesh (ASTM) screen; the resulting powder (fluoroaluminosilicate glass powder) was incorporated as the filler.

Evaluating Curability Under Wet Conditions

For evaluation of curability under wet conditions, each of the samples was subjected to a compression test as specified in JIS/6609-1: 2005 8.4. Briefly, the first component and the second component were blended at a weight ratio of 1:1 and charged into a mold (4×6 mm$^H$), where the blend was cured for an hour under a wet condition (100% humidity); thereafter, the cured test pieces were immersed in water at 37° C. for 24 hours and compressed at a crosshead speed of 1 mm/min. Usually, the compression test is performed 24 hours after the end of the blending operation; since it was also necessary to evaluate the initial curability of the polymerizable composition of the present invention, a compression test was also carried out 10 minutes after the end of the blending, provided that the cured test pieces as obtained under the wet condition were not immersed in water at 37° C. for 24 hours. The results are shown in Table 2.

Test for Verifying Storage Stability

In Examples 1-4 and Comparative Examples 1-3, each sample of polymerizable composition was stored at 50° C. for 12 weeks; the time it took to cure was measured at week 0 (just after preparation) and at week 12. In a thermostated chamber (23±1° C.), the first and second components were each metered out in an amount of 0.2 g on a mixing pad and mixed uniformly by kneading for 15 seconds with a spatula and the exothermic curve for the polymerizable composition was measured as specified in ISO 4029:2000 7.6. The method of reading the cure time was essentially the same as specified in ISO 4029:2000 7.8. The results are also shown in Table 2.

As is clear from Table 2, even when compared with the samples of Comparative Examples 1 and 2 (i.e., polymerizable compositions using polymerization initiators containing thiourea derivatives), the samples of Examples 1 to 4 as polymerizable compositions that used polymerization initiator systems consisting of an organic peroxide, a cysteine, and a polymerization promoter were verified to have satisfactory properties in terms of both curability under wet conditions and storage stability irrespective of the types of (meth)acrylate compounds commonly used in dental materials and regardless of whether a (meth)acrylate compound having an acid group was used or not.

TABLE 2

Unit: wt %

|  |  |  | Example 1 | Example 2 | Example 3 | Example 4 | Comparative example 1 | Comparative example 2 | Comparative example 3 |
|---|---|---|---|---|---|---|---|---|---|
| First component | (Meth)acrylate monomer | HEMA | 28 | 28 |  | 25 |  | 18 | 18 |
|  |  | M-90G |  |  | 25 |  | 28 |  |  |
|  |  | TEGDMA | 4.77 | 4.75 | 9.76 | 9.74 | 4.82 | 14.78 | 14.78 |
|  | (Meth)acrylate monomer having an acid group | MDP | 5 |  |  | 5 | 3 |  |  |
|  |  | 4MET |  | 10 | 10 |  |  | 12 | 12 |
|  | Oxidizing agent (organic peroxide) | CHPO | 0.99 | 0.99 |  |  | 1.00 | 1.00 | 1.00 |
|  |  | t BHPO |  |  | 0.99 | 0.99 |  |  |  |
|  | Polymerization promoter | Acetylacetone copper | 0.05 |  | 0.03 |  |  |  |  |
|  |  | Copper sulfate |  | 0.05 |  |  |  |  |  |
|  |  | Copper gluconate |  |  |  | 0.07 |  |  |  |
|  | Filler | SiO$_2$ powder | 49 | 44 | 44 | 39 | 55 | 45 | 45 |
|  |  | Aerosil | 5 | 5 | 5 | 5 | 5 | 5 | 5 |
|  | Other additives | DW | 7 | 7 | 5 | 15 | 3 | 4 | 4 |
|  |  | IA (polymerization inhibitor) | 0.19 | 0.21 | 0.22 | 0.20 | 0.18 | 0.22 | 0.22 |
|  | Total |  | 100 | 100 | 100 | 100 | 100 | 100 | 100 |
| Second component | (Meth)acrylate monomer | UDMA | 15 | 10 |  | 10 | 15 | 30 | 30 |
|  |  | Bis-GMA | 10 |  | 25 |  | 15 |  |  |
|  |  | TEGDMA | 9.49 | 24.49 | 9.49 | 24.83 | 4.45 | 4.77 | 5.76 |
|  | Reducing agent (cysteines) | N-acetyl-L-cysteine | 0.99 | 0.99 |  |  |  |  |  |
|  |  | L-cysteine |  |  | 0.99 | 1.00 |  |  |  |
|  | Reducing agent (thiourea derivative) | Acetylthiourea |  |  |  |  | 0.99 |  |  |
|  |  | N-benzoylthiourea |  |  |  |  |  | 1.00 |  |
|  | Polymerization promoter | Vanadyl acetylacetonate |  |  |  |  | 0.04 | 0.06 | 0.06 |
|  | Filler | Glass powder | 62 | 60 | 62 | 60 | 62 | 62 | 62 |
|  |  | Aerosil | 2 | 4 | 2 | 4 | 2 | 2 | 2 |
|  | Other additives | IA (polymerication inhibitor) | 0.17 | 0.17 | 0.17 | 0.17 | 0.17 | 0.17 | 0.18 |
|  |  | TPO (photopolymerization catalyst) | 0.35 | 0.35 | 0.35 |  | 0.35 |  |  |
|  | Total |  | 100 | 100 | 100 | 100 | 100 | 100 | 100 |

TABLE 2-continued

| | Example 1 | Example 2 | Example 3 | Example 4 | Comparative example 1 | Comparative example 2 | Unit: wt % Comparative example 3 |
|---|---|---|---|---|---|---|---|
| Compressive strength (after 10 min) | 69 MPa | 57 MPa | 35 MPa | 51 MPa | 30 MPa | 53 MPa | — |
| Compressive strength (after 24 hr) | 154 MPa | 132 MPa | 72 MPa | 120 MPa | 64 MPa | 127 MPa | — |
| Cure time | 10 min | 9 min | 8 min | 8 min | 9 min | 10 min | did not cure |
| cure time (after 12 wk at 50° C.) | 13 min | 11 min | 11 min | 9 min | 12 min | 13 min | did not cure |

What is claimed is:

1. A polymerizable composition that comprises a first component comprising a first (meth)acrylate compound and an organic peroxide as an oxidizing agent and a second component comprising a second (meth)acrylate compound and a cysteine compound as a reducing agent which has a partial structure represented by the following structural formula, the first component and/or the second component further comprising a polymerization promoter:

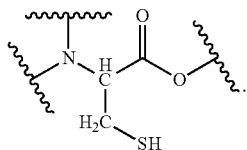 [SMILES: *OC(=O)C(CS)N(*)*]

wherein an amount of the cysteine compound incorporated in the second component is 0.1 to 5 wt %.

2. The polymerizable composition as claimed in claim 1, wherein the polymerization promoter is a copper compound or a vanadium compound,
wherein the copper compound is at least one member selected from the group consisting of copper sulfate, acetylacetone copper, copper chloride, copper gluconate, copper oleate, and ethylenediaminetetraacetic acid disodium copper (II), and
wherein the vanadium compound is at least one member selected from the group consisting of vanacium acetylacetonate, vanadyl acetylacetonate, vanadyl stearate, vanadium naphthenate, and vanadium benzoylacetonate.

3. The polymerizable composition as claimed in claim 1, wherein the cysteine compound is at least one member selected from the group consisting of cysteine, acetylcysteine, cysteine methyl ester, and cysteine ethyl ester.

4. The polymerizable composition as claimed in claim 1, wherein the first and/or second (meth)acrylate compound is at least one member selected from the group consisting of methyl (meth)acrylate, ethyl (meth)acrylate, isopropyl (meth)acrylate, n-butyl (meth)acrylate, isobutyl (meth)acrylate, hydroxypropyl (meth)acrylate, tetrahydrofurfuryl (meth)acrylate, glycidyl (meth)acrylate, 2-hydroxyethyl (meth)acrylate, 2-hydroxypropyl (meth)acrylate, 3-hydroxypropyl (meth)acrylate, 2-methoxyethyl (meth)acrylate, 2-ethoxyethyl (meth)acrylate, 2-ethylhexyl (meth)acrylate, benzyl (meth)acrylate, 2-hydroxy-1,3-di(meth)acryloxypropane, ethylene glycol di(meth)acrylate, diethylene glycol di(meth)acrylate, triethylene glycol di(meth)acrylate, butylene glycol di(meth)acrylate, neopentyl glycol di(meth)acrylate, 1,3-butanediol di(meth)acrylate, 1,4-butanediol di(meth)acrylate, 1,6-hextanediol di(meth)acrylate, trimethylolpropane tri(meth)acrylate, trimethylolethane tri(meth)acrylate, pentaerythritol tri(meth)acrylate, trimethylolmethane tri(meth)acrylate, pentaerythritol tetra(meth)acrylate, polybutylene glycol di(meth)acrylate, bisphenol A diglycidyl (meth)acrylate, di-2-(meth)acryloxyethyl-2,2,4-trimethylhexamethylene dicarbamate, 1,3,5-tris[1,3-bis{(meth)acryloyloxy}-2-propoxycarbonylaminohexane]-1,3,5-(1H,3H,5H)triazine-2,4,6-trione, 2,2-bis-4-(3-(meth)acryloxy-2-hydroxypropyl)-phenylpropane, 2,2'-di(4-hydroxycyclohexyl)propane, 2-oxepanone, hexamethylene diisocyanate, and 2-hydroxyethyl (meth)acrylate, a (meth)acrylate of a urethane oligomer consisting of 1,3-butanediol, hexamethylene diisocyanate, and 2-hydroxyethyl (meth)acrylate, 2-(meth)acryloyloxyethyl dihydrogen phosphate, bis[2-(meth)acryloyloxyethyl dihydrogen]phosphate, 2-(meth)acryloyloxyethylphenyl dihydrogen phosphate, 6-(meth)acryloyloxyhexyl dihydrogen phosphate, 6-(meth)acryloyloxyhexylphenyl dihydrogen phosphate, 10-(meth)acryloyloxydecyl dihydrogen phosphate, 1,3-di(meth)acryloylpropane-2-dihydrogen phosphate, 1,3-di(meth)acryloylpropane-2-phenyl hydrogen phosphate, bis[5-[2-(meth)acryloyloxyethoxycarbonyl]heptyl]hydrogen phosphate, 4-(meth)acryloxyethyl trimellitic acid, 4-(meth)acryloxyethyl trimellitic anhydride, 4-(meth)acryloxydecyl trimellitic acid, 4-(meth)acryloxydecyl trimellitic anhydride, 11-(meth)acryloyloxy-1,1-undecanedicarboxylic acid, 1,4-di(meth)acryloyloxypyromellitic acid, 2-(meth)acryloyloxyethyl maleic acid, 2-(meth)acryloyloxyethyl phthalic acid, and 2-(meth)acryloyloxyethyl hexahydrophthalic acid.

5. The polymerizable composition as claimed in claim 4, wherein the first and/or second (meth)acrylate compound is at least one member selected from the group consisting of 10-(meth)acryloyloxydecyl dihydrogen phosphate, 4-(meth)acryloxyethyl trimellitic acid, and 4-(meth)acryloxyethyl trimellitic anhydride.

6. The polymerizable composition as claimed in claim 1, wherein the organic peroxide is at least one member selected from the group consisting of tert-butyl hydroperoxide and cumene hydroperoxide.

* * * * *